3,043,663
PROCESS FOR PREPARING SILANE
Harold L. Jackson, Wilmington, Del., assignor to E. I. du Pont de Nemours and Company, Wilmington, Del., a corporation of Delaware
No Drawing. Filed Aug. 1, 1957, Ser. No. 675,575
9 Claims. (Cl. 23—204)

This invention relates to silane and more particularly to a new method for its preparation.

Silane, $SiH_4$, is a very reactive compound from which almost any silicon compound can be prepared. It is of particular interest in several specific applications, among which are the following: Silane can be pyrolyzed to silicon; it can be added to olefins to form organosilicon compounds, which can be hydrolyzed to silicones; and it can be converted to reactive silyl halides by reaction with hydrogen halides.

Heretofore, silane has been prepared by various methods, such as, for example, by the reaction of hydrochloric acid on magnesium silicide, and by hydrogenation of halosilanes. However, such methods generally possess certain deficiencies such as for instance, requiring the use of expensive or relatively unavailable starting materials.

Therefore, an object of this invention is to provide a novel method for preparing silane of extremely high purity from low-cost and readily available starting materials. A further object is provision of a more economical preparation of silane especially suitable for use in large-scale operation.

These and other objects are accomplished in accordance with the present invention by a process which comprises contacting a salt of fluosilicic acid with hydrogen at a temperature of at least 80° C. in the presence of an electropositive metal having an atomic number between 3 and 30, inclusive, and having a standard electrode potential of at least 0.44 volt, and in the presence of a reaction medium comprising an aluminum trihalide alone or in combination with one or more halides of elements of groups I–A, II–A and II–B of the periodic table having atomic numbers less than 80 and in which the halogens have atomic numbers between 17 and 53, inclusive, the reaction medium being inert to silane under the reaction conditions.

The fluosilicate starting material for the process of this invention can be any salt of fluosilicic acid ($H_2SiF_6$). The alkali metal and the alkaline earth metal fluosilicates are preferred starting materials because of their availability and low cost. Specific fluosilicates that are operable in the process of this invention include ammonium, sodium, potassium, cesium, magnesium, calcium, barium, copper, zinc, manganese, aluminum, and iron fluosilicates. These fluosilicates need not be especially purified for use in the process of this invention, as the ordinary grades of these materials commercially available are satisfactory.

Any electropositive metal having an atomic number between 3 and 30, inclusive, and a standard electrode potential greater than 0.44 volt can be used in the process of this invention. The standard electrode potentials referred to herein are those given on pages 340–341 of Latimer's "Oxidation Potentials," 2nd ed. (1953), Prentice-Hall, Inc. In some cases, the exact order of electrode potentials of these electropositive metals will vary when the electrode potential is determined in inorganic fused salts, and at different temperatures; however, this does not affect their operability in the process of this invention. The electropositive metals defined above include lithium, beryllium, sodium, magnesium, aluminum, calcium, chromium, manganese, iron, and zinc. They are all operable. Aluminum is the preferred electropositive metal because of its availability and high reactivity.

The particle size of these electropositive metals is not critical. However, it is preferred to use these metals in a form having a high surface area per unit weight in order to obtain more rapid reaction. Metals in the form of powder, granules, turnings, and the like are preferred.

As indicated above, any aluminum trihalide or mixture of aluminum trihalide with one or more halides of metals of groups I–A, II–A and II–B of the periodic table having atomic numbers less than 80, in which halides the halogens have atomic numbers between 17 and 53, inclusive, and which is inert to silane under the reaction conditions can be used as the reaction medium in the process of this invention. The preferred reaction media are mixtures of an aluminum trihalide with one or more alkaline or alkaline earth metal halide, i.e., with one or more of the halides of metals of groups I–A and II–A.

The periodic table referred to in this specification is the table given in Deming's "General Chemistry," 5th ed. (1944), John Wiley & Sons, Inc.

The proportions of the different metal halides in the reaction medium are not critical, mixtures containing as little as 1% of the alkali or alkaline earth metal halide being operable. When low-melting reaction media are desired, it is especially preferred to use a mixture of an aluminum trihalide with one or more of the halides of metals of groups I–A, II–A and II–B containing at least 50 mole percent of the aluminum trihalide. It is not necessary, however, that the reaction medium be molten under the reaction conditions employed, since silane is formed when the reaction is carried out at a temperature below the melting point of the particular metal halide reaction medium being used.

Specific metal halides and mixtures of metal halides that are useful reaction media include aluminum trichloride, aluminum tribromide, aluminum triiodide, mixtures of any of these trihalides with one or more of lithium, sodium, potassium, rubidium, cesium, calcium, magnesium, barium, zinc, and cadmium chlorides, bromides or iodides.

As already indicated, the process of this invention can be carried out at temperatures of at least 80° C. Preferably, the reaction is carried out at a temperature between 150° and 400° C. It will be understood that the particular temperature employed in any individual case is selected with regard to the specific reaction medium and operating pressure being employed.

The pressure at which the process of this invention is carried out is not critical, pressures ranging from subatmospheric to superatmospheric being satisfactory. It is preferred in carrying out the reaction at the lower temperatures described above to employ a reaction pressure between 100 and 1000 atmospheres.

The reaction time required for preparing silane by the process of this invention is likewise not critical. Reaction times ranging from a few seconds, for example, 5–10 seconds, up to several hours and longer, say, about 24 hours, can be used. The exact time in any instance depends on the particular operating temperature being employed. At temperatures between 80° and 400° C. reaction times up to 24 hours are satisfactory. However, when higher temperatures are used, it is preferred that shorter reaction times, for example, 5–10 seconds or less, be employed since silane decomposes slowly at about 400° C. and rapidly above 800° C.

The proportions of the reactants used in the process of this invention are not critical. However, an excess of hydrogen and an excess of electropositive metal, based on the amount of fluosilicate employed is preferred. The excess of hydrogen and electropositive metal can range up to 100% or more, based on the weight of the fluosilicate.

The process of this invention is conveniently carried out in a corrosion-resistant reaction vessel capable of withstanding superatmospheric pressure. Preferably, the reaction vessel is capable of being agitated, or means are provided for stirring the reaction mixture, although this is not essential. If the reactor is to be agitated, it is often convenient to include in the reaction vessel a mixing aid, for example, stainless steel balls, in order to provide more efficient mixing during the reaction.

The reactor, preferably after being purged with an inert gas, such as, for example, helium, is charged with the fluosilicate, the electropositive metal and the reaction medium. Hydrogen is then introduced into the reaction vessel to provide the desired operating temperature at the pressure selected for the reaction and the vessel it heated to that temperature. Additional hydrogen can be introduced periodically to maintain the pressure at the desired value. However, this is not essential if an excess of hydrogen has been introduced at the start of the reaction.

After the reaction is completed, which may be indicated by the cessation of the absorption of hydrogen, the reaction vessel is cooled. If the reactor has been agitated during the reaction period, it is desirable to inject hydrogen periodically during the cooling step to remove any solid materials that might be plugging the outlet. After the cooling operation, volatile reaction products are carefully bled through a trap cooled to a low temperature, e.g., the temperature of liquid nitrogen, to isolate silane. Unreacted hydrogen passes through the liquid nitrogen-cooled trap.

The process of this invention can also be carried out in a continuous flow system, in which the fluosilicate, the electropositive metal, and the metal halide reaction medium are passed through a reaction zone maintained at the desired temperature and under the desired pressure of hydrogen. This type of process is particularly advantageous for use when temperatures in the upper portion of the operable range are employed, for example, at temperatures of 400° to 1000° C., since the silane produced can be removed from the reaction zone rapidly to minimize its decomposition.

Still other methods of carrying out the process of this invention involve passing hydrogen through a static melt consisting of a molten metal halide reaction medium containing the electropositive metal and the fluosilicate, or passing hydrogen through a bed of finely divided solid metal halide reaction medium, electropositive metal and fluosilicate. In these embodiments additional fluosilicate is added periodically during the reaction.

The hydrogen used in the process of this invention should be essentially oxygen-free.

The process of this invention is illustrated in further detail by the following examples.

*Example I*

A stainless steel-lined pressure vessel of 400 ml. capacity, which has been purged with dry nitrogen, is charged with 37.6 g. of sodium fluosilicate (containing 13.8% silicon), 30 g. of 80–100 mesh aluminum powder, 113 g. of anhydrous aluminum chloride, 30 g. of sodium chloride, and 30 stainless steel balls (⅜ inch in diameter). The reaction vessel is carefully closed under a dry nitrogen atmosphere and hydrogen is added until the pressure within the vessel is 300 atmospheres at 270° C. The contents are heated to 250° C., the hydrogen pressure is increased to 800 atmospheres, and the vessel is shaken. The reactants are maintained at 247–250° C. and a hydrogen pressure of 800–830 atmospheres for 8 hours with continuous shaking. At the end of the 8-hour reaction period, agitation is discontinued and the reaction vessel is cooled. The inlet tube is cleared periodically by injecting hydrogen into the vessel when the temperature reaches 140°, 128°, and 105° C. to prevent plugging. When the reaction mixture reaches room temperature (about 25° C.), the volatile products are vented through a series of two traps cooled in liquid nitrogen. The condensate collected in the traps, amounting to 4.0 g., is transferred to a stainless steel cylinder. Examination of this product in the mass spectrograph shows that it is silane containing less than 0.1% impurities. This amount of silane represents a conversion of 68%, based on the silicon content of the fluosilicate.

*Example II*

Following the procedure described in Example I, a stainless steel-lined pressure vessel is charged with 30 g. of barium fluosilicate (containing 6.42% silicon), 30 g. of calcium granules (40–80 mesh), 113 g. of anhydrous aluminum trichloride, 30 g. of sodium chloride, and 30 stainless steel balls. Hydrogen is introduced to obtain a pressure of 400 atmospheres at room temperature and the reaction mixture is then heated to 200° C. More hydrogen is introduced to bring the pressure to 760 atmospheres. The reaction vessel is agitated and maintained at 198–202° C. and at 745–760 atmospheres pressure for 15 hours. There is isolated in the nitrogen trap 0.4 g. of condensed reaction product which is shown by mass spectrographic analysis to contain 30–35% silane.

*Example III*

A pressure vessel is charged as described in the preceding examples with 47.5 g. of zinc fluosilicate hexahydrate, 60 g. of zinc metal (through 120 mesh), 60 g. of zinc metal (through 20 mesh), 193 g. of anhydrous aluminum chloride, 30 g. of sodium chloride, and 30 stainless steel balls. Care is taken in mixing the reactants since the hydrated zinc fluosilicate reacts vigorously with the anhydrous aluminum trichloride.

Using the procedure described in the preceding examples, the reaction vessel is pressured with hydrogen to 400 atmospheres at room temperature and then heated to 200° C. The pressure of hydrogen is increased to 760 atmospheres, whereupon the vessel is agitated and maintained at 198–203° C. at 760–865 atmospheres for 14.5 hours. After the vessel is cooled, there is obtained about 0.2 g. of volatile product, condensable at liquid nitrogen temperature but not condensable at solid carbon dioxide temperature, containing 13–19% silane.

*Example IV*

A pressure vessel of the type used in the preceding examples is charged with 33 g. of potassium fluosilicate (containing 12.5% silicon), 25 g. of aluminum powder (80–100 mesh), 113 g. of anhydrous aluminum trichloride, 11.3 g. of sodium chloride, 11.3 g. of potassium chloride, and 16 g. of anhydrous zinc chloride. The reaction vessel, containing the above reactants and 30 stainless steel balls, is heated to 150° C. for 30 minutes to obtain a uniform molten reaction medium. The reaction vessel is then cooled to 90° C. and pressured to 750 atmospheres with hydrogen. The reactor is agitated and maintained at 89–90° C. for 14 hours at 750 atmospheres. The condensed volatile reaction products isolated in the cold trap contain 0.1 g. of silane (corresponding to a yield of 3%).

*Example V*

A pressure vessel is charged with 33 g. of potassium fluosilicate (containing 12.5% silicon), 30 g. of aluminum (20–80 mesh), 113 g. of anhydrous aluminum trichloride, and 30 g. of sodium chloride. As in the preceding examples, the pressure vessel containing the reactants and 30 stainless steel balls is pressured with hydrogen at room temperature to a pressure of 400 atmospheres. The vessel is then heated to 200° C. and the hydrogen pressure is increased to 750 atmospheres. The vessel is agitated and maintained at 200° C. for 11.5 hours under a pressure of 750–830 atmospheres. There is isolated in the cold trap 2.9 g. of silane (corresponding to 92% yield).

Example VI

Following the usual procedure, the reaction vessel is charged with 35.8 g. of sodium fluosilicate (containing 13.8% silicon), 30 g. of aluminum powder (80–100 mesh), 113 g. of anhydrous aluminum trichloride, and 30 stainless steel balls. The reactor is pressured with hydrogen to 400 atmospheres at 35° C., then heated to 259° C. The pressure is then increased to 750 atmospheres and the reaction mixture is agitated for 11.5 hours at a temperature of 248–259° C. under a hydrogen pressure of 750 atmospheres. There is isolated in the cold trap 0.9 g. of silane (corresponding to a yield of 16%).

Example VII

Following the customary procedure, the reaction vessel is charged with 32 g. of zinc fluosilicate hexahydrate, 60 g. of aluminum (40 g. of 20–80 mesh and 20 g. of 80–100 mesh particles), 226 g. of anhydrous aluminum trichloride, and 30 stainless steel balls. Care is used in mixing the reactants since the hydrated zinc fluosilicate reacts vigorously with the anhydrous aluminum trichloride. The reaction vessel is pressured to 400 atmospheres with hydrogen at room temperature and then heated to 180° C. The hydrogen pressure is then brought up to 750 atmospheres. The reaction mixture is agitated for 15 hours at 180° C. and 750 atmospheres pressure. The volatile reaction product condensed in the liquid nitrogen trap contains 0.2 g. of silane (corresponding to 6% yield).

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A method for preparing silane which comprises reacting a salt of fluosilicic acid with hydrogen at a temperature of at least 80° C. in the presence of an electropositive metal having an atomic number between 3 and 30, inclusive, and having a standard electrode potential of at least 0.44 volt and in the presence of a reaction medium inert to silane under the reaction conditions, said reaction medium comprising an aluminum trihalide in which the halogens have atomic numbers between 17 and 53, inclusive.

2. A method for preparing silane which comprises reacting a salt of fluosilicic acid with hydrogen at a temperature of at least 80° C. in the presence of an electropositive metal having an atomic number between 3 and 30, inclusive, and having a standard electrode potential of at least 0.44 volt and in the presence of a reaction medium inert to silane under the reaction conditions, said reaction medium comprising an aluminum trihalide and at least 1 member of the group consisting of halides of elements of groups I–A, II–A and II–B of the periodic table having atomic numbers less than 80 and in which the halogens have atomic numbers between 17 and 53, inclusive.

3. Process of claim 2 wherein said reaction medium contains at least 50 mole percent of the aluminum trihalide.

4. Process of claim 1 wherein the salt of fluosilicic acid is selected from the group consisting of alkali metal fluosilicates and alkaline earth metal fluosilicates.

5. Process of claim 1 wherein the electro-positive metal is in a form having a high surface area per unit weight.

6. Process of claim 1 wherein the electro-positive metal is aluminum.

7. A method for preparing silane which comprises contacting a salt of fluosilicic acid with hydrogen at a temperature within the range of 150 and 400° C. in the presence of an electropositive metal having an atomic number between 3 and 30, inclusive, and having a standard electrode potential of at least 0.44 volt and in the presence of a reaction medium inert to silane under the reaction conditions, said reaction medium comprising an aluminum trihalide in which the halogens have atomic numbers between 17 and 53, inclusive.

8. The process of claim 1 wherein there is employed an excess of hydrogen and electropositive metal based on the weight of fluosilicate.

9. The process of claim 2 wherein said reaction medium consists essentially of an aluminum trihalide and at least one metal halide selected from the class consisting of alkali halides and alkaline earth metal halides.

References Cited in the file of this patent

UNITED STATES PATENTS

| | | |
|---|---|---|
| 2,458,703 | Hatcher | Jan. 11, 1949 |
| 2,469,879 | Hurd | May 10, 1949 |
| 2,857,414 | Schmidt et al. | Oct. 21, 1958 |
| 2,875,028 | Wenternitz | Feb. 24, 1959 |
| 2,888,327 | Adams | May 26, 1959 |

FOREIGN PATENTS

| | | |
|---|---|---|
| 1,122,000 | France | May 14, 1956 |

OTHER REFERENCES

Hurd: "Chemistry of the Hydrides," 1952, pages 64–65.

Hurd: "Journal of the American Chemical Society," vol. 67, pages 1545–1548.

Latimer: "Oxidation Potentials," 2nd ed., 1952, pages 340–341.

Friend: "Textbook of Inorganic Chemistry," 1917, vol. V, page 194.